United States Patent

Fujikura et al.

[11] Patent Number: 6,118,963
[45] Date of Patent: Sep. 12, 2000

[54] METHOD AND APPARATUS FOR ELIMINATING POSITIONAL DEVIATIONS OF A PHOTOSENSITIVE DRUM DRIVEN BY A STEPPING MOTOR WHICH IS BY HALF STEPS

[75] Inventors: Teruhiko Fujikura, Aichi-Ken; Toshikazu Higashi, Toyokawa; Tomonobu Tamura, Aichi-Ken; Akira Takasu, Toyokawa, all of Japan

[73] Assignee: Minolta Co., Ltd., Osaka, Japan

[21] Appl. No.: 09/186,069

[22] Filed: Nov. 5, 1998

[30] Foreign Application Priority Data

Nov. 6, 1997 [JP] Japan .................................. 9-303902

[51] Int. Cl.7 .................................................. G03G 15/00
[52] U.S. Cl. ............................................................ 399/167
[58] Field of Search ..................................... 399/1, 4, 167

[56] References Cited

U.S. PATENT DOCUMENTS 5,072,244  12/1991  Aoki et al. ............................. 399/4 X
5,592,261  1/1997  Yoshino .................................. 399/167

FOREIGN PATENT DOCUMENTS

06149137  5/1994  Japan .
06186239  7/1994  Japan .

*Primary Examiner*—Fred L. Braun
*Attorney, Agent, or Firm*—McDermott, Will & Emery

[57] ABSTRACT

An apparatus and method for eliminating position deviations of a photosensitive drum which is rotated by a stepping motor driven by full step and half step drive pulses. The apparatus includes a photosensitive drum, a stepping motor which rotates the photosensitive drum; and a controller which controls the stepping motor to be driven with half step drive pulses when the photosensitive drum is being scanned. In the apparatus and method, a scanning starting control is performed by driving the stepping motor by full step drive pulses so that salient poles of the rotor are aligned with salient poles of the stator such that the rotor is in a stable position. The full step drive pulses are switched to half step drive pulses before scanning is started, and the scanning of the photosensitive drum is started on an even numbered half step drive pulse.

19 Claims, 8 Drawing Sheets

FIG. 4A — CLOCK PULSE TRAIN

FIG. 4B — DRIVE PULSE TRAIN (FULL-STEP DRIVE)

FIG. 4C — DRIVE PULSE TRAIN (HALF-STEP DRIVE)

METHOD AND APPARATUS FOR ELIMINATING POSITIONAL DEVIATIONS OF A PHOTOSENSITIVE DRUM DRIVEN BY A STEPPING MOTOR WHICH IS BY HALF STEPS

This application is based on an application No. 9-303902 filed in Japan, the content of which is hereby incorporated by reference.

BACKGROUND OF THE INVENTION (1) Field of the Invention

The present invention relates to an image forming apparatus, and especially relates to an image forming apparatus provided with a photosensitive drum which is driven by a stepping motor.

(2) Related Art

A conventional photosensitive drum is rotated in the sub-scanning direction and exposed by a laser beam in a certain cycle in the main scanning direction, and as a result, an electrostatic latent image is formed on the surface of the photosensitive drum. When the rotational speed of the photosensitive drum is unstable, distances between the scanning lines are not kept uniform, thereby causing deterioration on a reproduced image. As such, in recent years, a stepping motor is used as a driving source of the photosensitive drum for its high performance in braking in comparison with other kinds of motors.

The stepping motor can be made to rotate by a step angle which is smaller than a standard step angle, such as a step angle that is half of the standard step angle (this drive mode is referred to as the "half-step drive" hereinafter). Consequently, the photosensitive drum is rotated more smoothly.

However, when the half-step drive is operational, a rotor is alternately rotated with a salient pole facing a salient pole of a stator and with the salient pole being located between two salient poles of the stator, making precision of the step angle low. More specifically, when the salient pole of the rotor is located between the two salient poles of the stator, forces of the two salient poles of the stator to attract the salient pole of the rotor are not always equal, so that the salient pole of the rotor is attracted more strongly to one of the two salient poles of the stator.

Thus, if an electrostatic latent image formation is started when the salient pole of the rotor is located between the two salient poles of the stator, a starting position of the electrostatic latent image formation on the photosensitive drum is deviated from the correct starting position in the sub-scanning direction.

SUMMARY OF THE INVENTION

The object of the present invention is to provide an image forming apparatus having a photosensitive drum which is scanned while being rotationally driven by a stepping motor that is made to rotate by a step angle smaller than a standard step angle, and having no deviations of the starting position in electrostatic latent image formation.

The object of the present invention can be achieved by an image forming apparatus including: a photosensitive drum; a stepping motor which is made to rotate by a small step angle smaller than a standard step angle and rotationally drives the photosensitive drum; an optical unit for scanning the photosensitive drum, which is rotationally driven by the stepping motor, one scanning line at a time using an optical beam to form a latent image on the photosensitive drum; and a controller for having the optical unit start a scanning on the photosensitive drum in synchronization with a timing at which one of excited salient poles of a stator faces one of salient poles of a rotor, the stator and the rotor being included in the stepping motor.

With this construction, the photosensitive drum is scanned in synchronization with a timing at which one of excited salient poles of the stator faces one of salient poles of the rotor, that is, a timing at which the rotor is in the stable position. Consequently, the starting position of latent image formation is not deviated from the correct starting position.

The object of the present invention can also be achieved by a method for controlling a scanning start timing of an image forming apparatus, the image forming apparatus including: a photosensitive drum; a stepping motor which is made to rotate by a standard step angle and a small step angle that is 1/m of the standard step angle, m being an integer which is greater than one, to rotate the photosensitive drum; an optical unit for scanning the photosensitive drum, which is rotationally driven by the stepping motor, one scanning line at a time using an optical beam to form a latent image on the photosensitive drum; and a pulse generating unit for generating a pulse train to rotate the rotor of the stepping motor by one step angle for each pulse, the step angle being one of a standard step angle during standard step angle drive and a small step angle during small step angle drive, and the method including; a first step for having the pulse generating unit generate a pulse train corresponding to the standard step angle drive; a second step for having the pulse generating unit switch to generating a pulse train corresponding to the small step angle drive; a third step for counting a number of pulses of the pulse train generated after a switching; and a fourth step for having the optical unit start the scanning on the photosensitive drum in synchronization with a timing at which the counted number of pulses reaches a multiple of m.

With this method, after the pulse train corresponding to the standard step angle drive is switched to the pulse train corresponding to the small step angle drive, the photosensitive drum is scanned in synchronization with a timing at which the count value of the pulses reaches a multiple of m, that is, a timing at which one of exciting salient poles of the stator faces one of salient poles of the rotor. As a result, the starting position of latent image formation is not deviated from the correct starting position.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF PREFERRED EMBODIMENTS

The following is a description of an embodiment of the image forming apparatus of the present invention. In the embodiment, a digital color copying machine (referred to as the "copier" hereinafter) is used as an example of such image forming apparatus.

Figure 1:
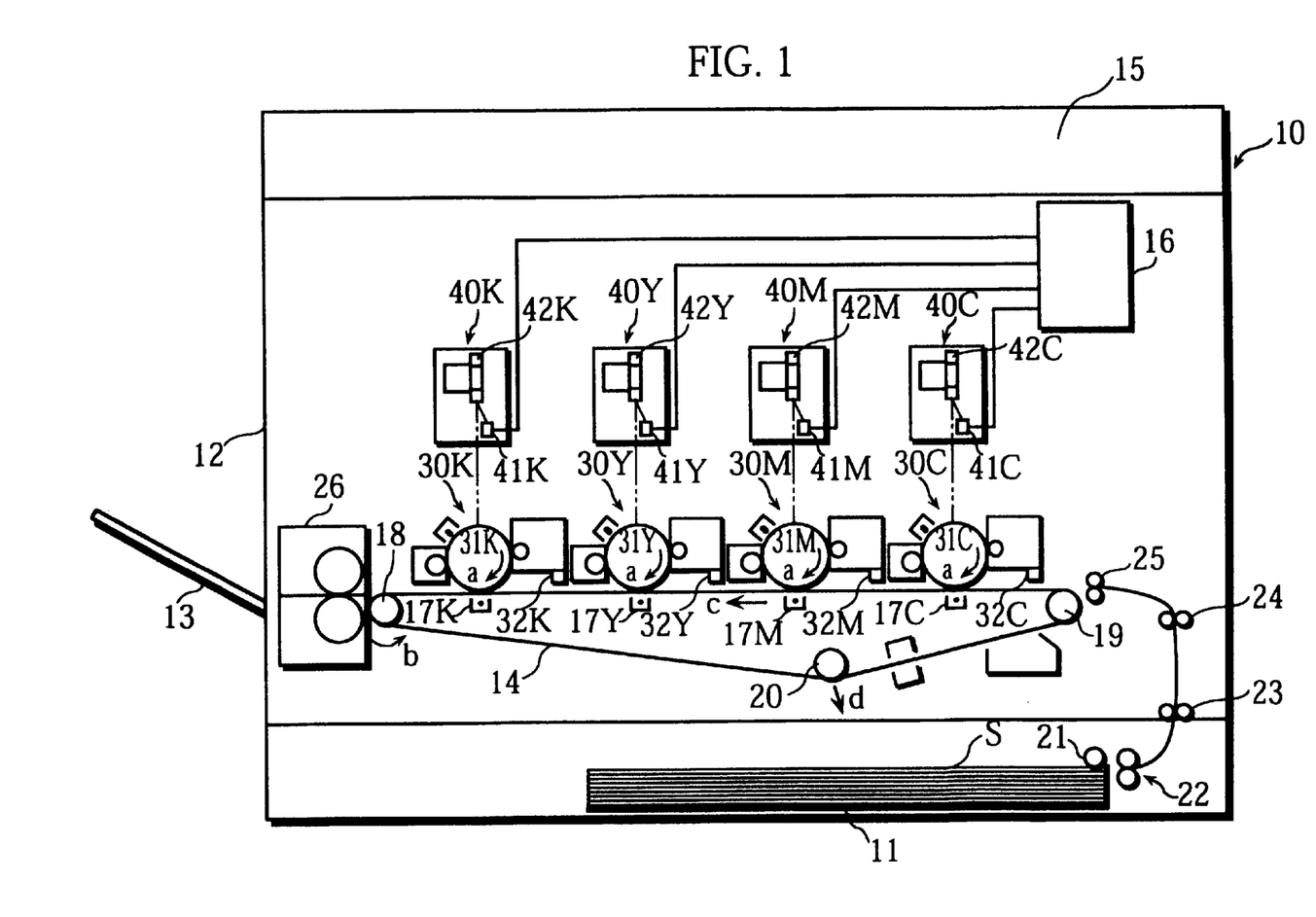
FIG. 1 shows an overall construction of a copying machine used in an embodiment of the present invention.

FIG. 1 shows a front view of the copier. This copier is a so-called "tandem-type" copier. A paper feeding cassette 11 is set at the lowermost part of an enclosure 10 and can be freely slid in and out of the copier. A paper discharge tray 13 is set on a left-side wall 12 and protrudes outward. A transport belt 14 is horizontally set in a lower space above the paper feeding cassette 11. A plurality (four in FIG. 1) of image forming units 30C, 30M, 30Y, and 30K are set above the transport belt 14 along its length. The transport belt 14 transports a recording sheet S, and the image forming units 30C to 30K sequentially transfer toner images for respective colors onto the recording sheet S, the toner images being superimposed on the recording sheet S, to form a color image.

An image reading unit 15 is set at the upper part of the enclosure 10, and optically reads image data of an original document. An image processing unit 16 performs the necessary processes on this read image data, and separates the image data into each color component, Cyan (C), Magenta (M), Yellow (Y), and Black (K). Laser diodes 41C to 41K of optical units 40C to 40K respectively set above the image forming units 30C to 30K are driven to perform light modulation in accordance with the image data for respective colors. Light-modulated laser beams are respectively deflected by polygon mirrors 42C to 42K in the main scanning direction and brought into the image forming units 30C to 30K corresponding to the respective colors.

The image forming units 30C to 30K respectively have unit constructions including photosensitive drums 31C to 31K as main components, chargers, and developing units. By means of these unit constructions, images are formed using an electrostatic copying method. More specifically, the light-modulated laser beams respectively scan the photosensitive drums 31C to 31K which are rotated in the direction of the arrows a, and electrostatic latent images formed through the scanning on the photosensitive drums 31C to 31K are visibly developed into toner images by the developing units. Note that toners C, M, Y, and K corresponding to the light-modulated colors of the optical units 40C to 40K are respectively supplied to the photosensitive drums 31C to 31K by the corresponding developing units of the image forming units 30C to 30K.

Transfer chargers 17C to 17K are set underneath the transport belt 14 at transfer positions located directly under the photosensitive drums 31C to 31K. Using the transfer chargers 17C to 17K, the toner images formed on the photosensitive drums 31C to 31K are sequentially transferred onto the recording sheet S.

The transport belt 14 runs over a driving roller 18, a slave roller 19, and a tension roller 20. The driving roller 18 is driven by a motor (not shown) and rotated in the direction of the arrow b. Together with the rotation of the driving roller 18, the transport belt 14 moves in the direction of the arrow c. Here, the rotational speed of the motor is controlled so that the moving speed of the transport belt 14 is equal to the circumferential speed of each photosensitive drum 31C to 31K when image formation is performed. The tension roller 20 is energized in the direction of the arrow d by a tensile spring (not shown) and keeps the tension of the transport belt 14 constant.

Resist sensors 32C to 32K are respectively set before the photosensitive drums 31C to 31K in the transport direction of the recording sheet S as shown in FIG. 1, and detect the leading edge of the recording sheet S which is transported on the transport belt 14. Each resist sensor 32C to 32K is set so that a distance between the detection position of the resist sensor and the transfer position of the corresponding photosensitive drum is longer than a circumferential distance of the photosensitive drum between the emitting position of the laser beam and the transfer position measured in the rotational direction of the photosensitive drum.

Figure 2:
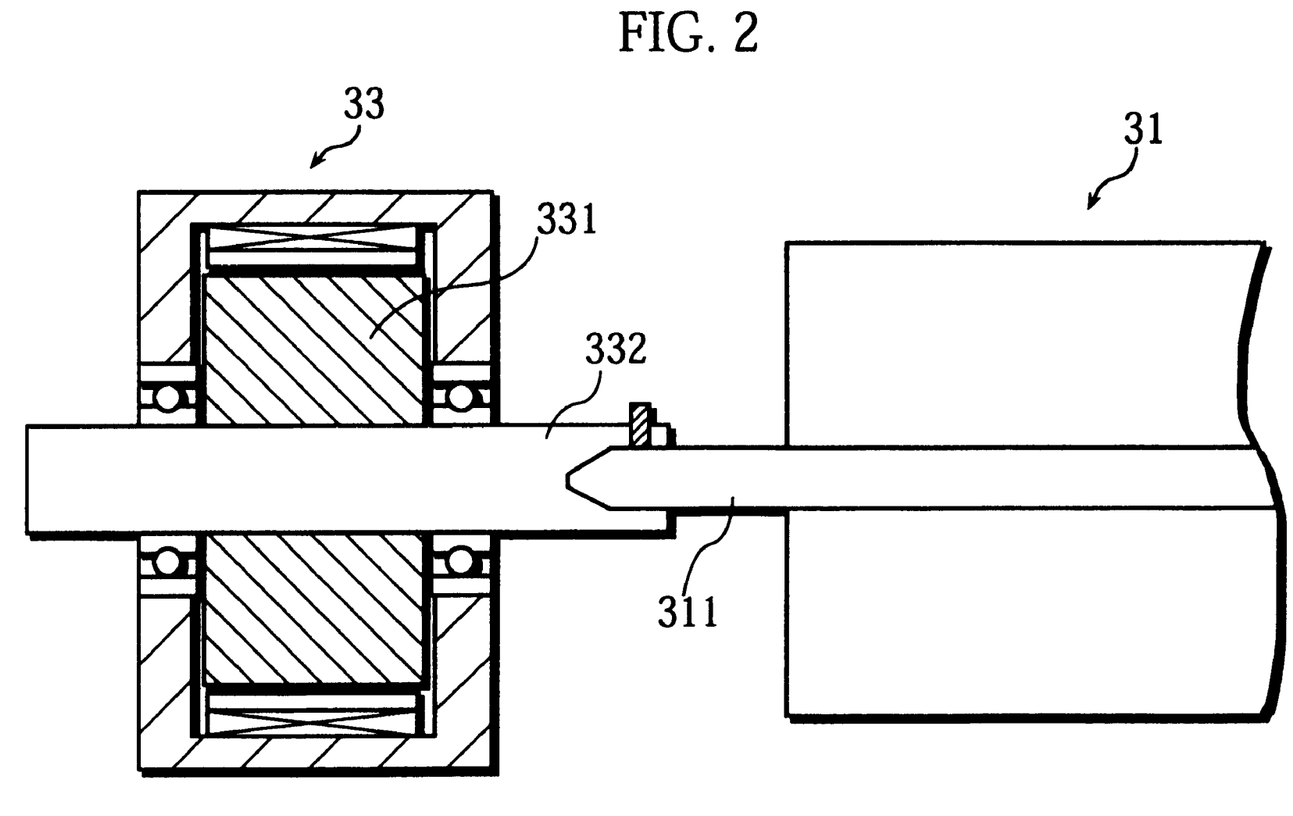
FIG. 2 shows an example of a connection state of a photosensitive drum and a stepping motor.
Figure 3:
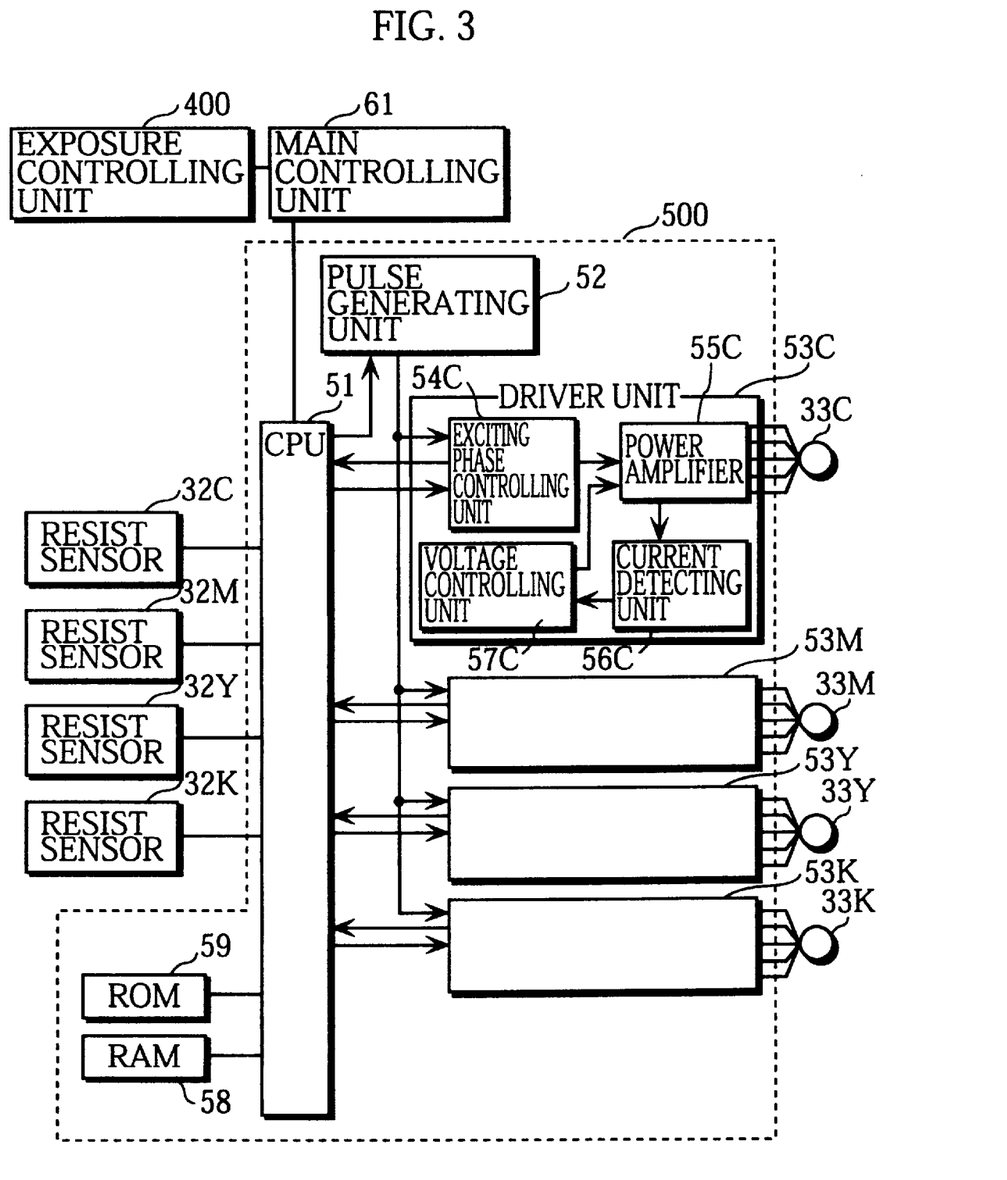
FIG. 3 is a block diagram mainly showing a construction of a drive controlling unit of stepping motors.

The photosensitive drums 31C to 31K are respectively rotationally driven by five-phase stepping motors 33C to 33K (shown in FIG. 3). Hereinafter, when a construction or an operation is explained which is common to the components assigned numerals with the corresponding C, M, Y, and K, the explanation will be given using the numerals without C, M, Y, and K. FIG. 2 is a cross-sectional view showing the connection state of the photosensitive drum 31 and the stepping motor 33. Using a well-known connection method, a rotational shaft 332 affixed to a rotor 331 of the stepping motor 33 is directly connected to a rotational shaft 311 of the photosensitive drum 31 without a reducer or the like.

With the stated construction of the copier, the recording sheet S is supplied from the paper feeding cassette 11 by a pick-up roller 21 and a pair of take-up rollers 22, and further passes through pairs of intermediate rollers 23 and 24. The recording sheet S stops immediately before a pair of synchronizing rollers 25 which is not currently rotated, with the leading edge of the recording sheet S being in contact with the pair of synchronizing rollers 25. By means of the pair of synchronizing rollers 25 which is rotationally driven at a predetermined timing, the recording sheet S is carried to the transport belt 14. The toner images for C, M, Y, and K are then sequentially transferred onto the recording sheet S transported on the transport belt 14. After the image transfer, the recording sheet S is transported by the transport belt 14 to a fixing unit 26, where the transferred image is fixed, and is finally discharged onto the paper discharge tray 13.

FIG. 3 is a block diagram showing a drive controlling unit 500 which mainly performs the driving control of the stepping motors 33C to 33K.

As shown in FIG. 3, the drive controlling unit 500 includes a CPU 51 as a main component which is connected to a main controlling unit 61 for controlling the entire copier, resist sensors 32C to 32K, a pulse generating unit 52, driver units 53C to 53K, a RAM 58, and a ROM 59. The CPU 51 performs controlling operations according to programs stored in the ROM 59. The main controlling unit 61 is connected to the image reading unit 15 (shown in FIG. 1), the image processing unit 16 (shown in FIG. 1), and an exposure controlling unit 400 for controlling the optical units 40C to 40K.

Figure 4A:
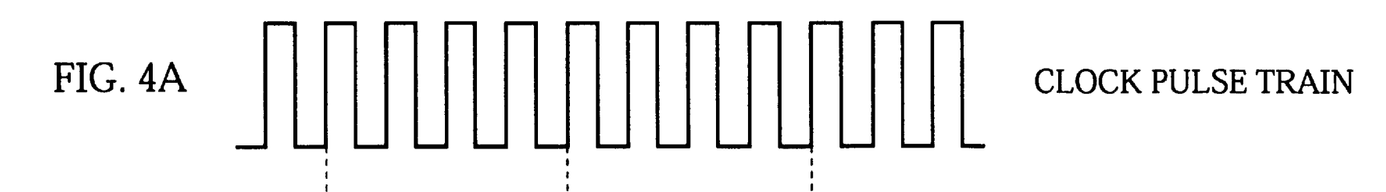
FIGS. 4A to 4C show a relation between a clock pulse train and drive pulse trains.

The pulse generating unit 52 generates a clock pulse train having a cycle corresponding to a frequency indicated by the CPU 51 (shown in FIG. 4A). By changing the cycle of a clock pulse, the rotational speed of the stepping motor 33 is variably controlled. Here, the frequency of the clock pulse train referred to in the specification means the number of pulses per unit of time.

The driver units 53C to 53K respectively control the stepping motors 33C to 33K to rotate at the rotational speed corresponding to the frequency of the clock pulse train, in accordance with an exciting phase switching based on an exciting mode switching signal outputted from the CPU 51. Here, the exciting mode switching signal is used for indicating an exciting mode out of five-phase-on and four-and-five-phase-on to an exciting phase controlling unit (described later). Hereinafter, these exciting modes are respectively referred to as the "five-phase-on drive" and the "four-and-five-phase-on drive". The exciting phase controlling unit identifies these exciting modes by High and Low signals. More specifically, the CPU 51 outputs a High signal to indicate the five-phase-on drive, while outputting a Low signal to indicate the four-and-five-phase-on drive.

The driver units 53C to 53K have the same construction, and therefore, only the driver unit 53C is described as one example.

The driver unit 53C is composed of an exciting phase controlling unit 54C, a power amplifier 55C, a current detecting unit 56C, and a voltage controlling unit 57C.

Figure 4B:
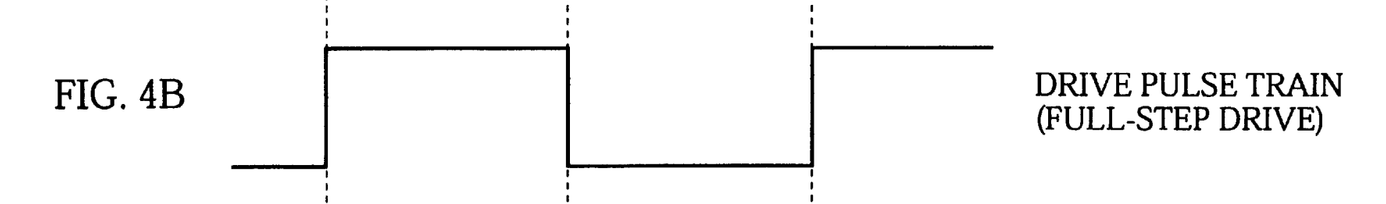
Figure 4C:
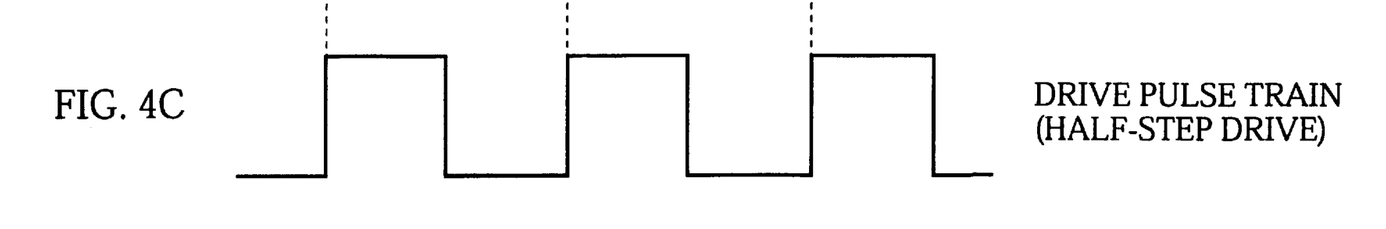

The exciting phase controlling unit 54C decreases the frequency of the clock pulse train to a one-eighth as shown in FIG. 4B when the exciting mode switching signal is High (that is, the five-phase-on drive is indicated), and decreases the frequency of the clock pulse train to a one-forth as shown in FIG. 4C when the exciting mode switching signal is Low (that is, the four-and-five-phase-on drive is indicated). In this way, the drive pulse train is generated corresponding to the exciting mode. The exciting phase controlling unit 54C, which is a kind of a shift register, switches exciting phases for each leading edge of the pulses of the drive pulse train and distributes a drive signal to each of the exciting phases of the stepping motor 33C. More specifically, the stepping motor 33 is rotated one step angle for each pulse of the drive pulse train. The exciting phase controlling unit 54C starts or stops the distribution of the drive signal in accordance with a start signal or a stop signal outputted from the CPU 51.

The power amplifier 55C amplifies the drive signal and passes a drive current through an exciting coil. The current detecting unit 56C detects a current value of the drive current, while the voltage controlling unit 57C controls the voltage applied to the exciting coil in accordance with the detected current value. Each of the power amplifier 55C, the current detecting unit 56C, and the voltage controlling unit 57C includes a well-known circuit.

When the five-phase-on drive is operational, the stepping motor 33 is made to rotate by a full-step angle, the step angle being the standard step angle (this drive mode is referred to as the "full-step drive" hereinafter). Meanwhile, when the four-and-five-phase-on drive is operational, the stepping motor 33 is made to rotate by a half-step angle, the step angle being half of the standard angle.

Figure 5A:
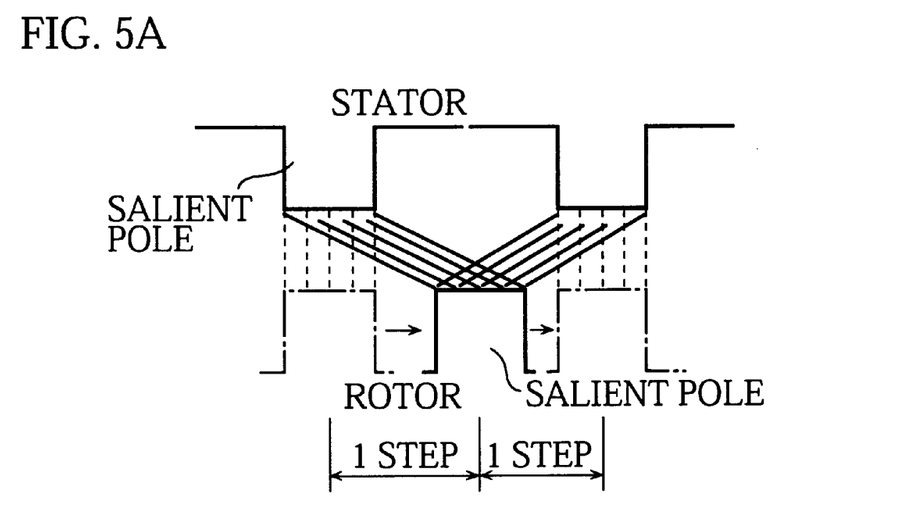
FIG. 5A shows a rotational state of a rotor in a half-step drive.
Figure 5B:
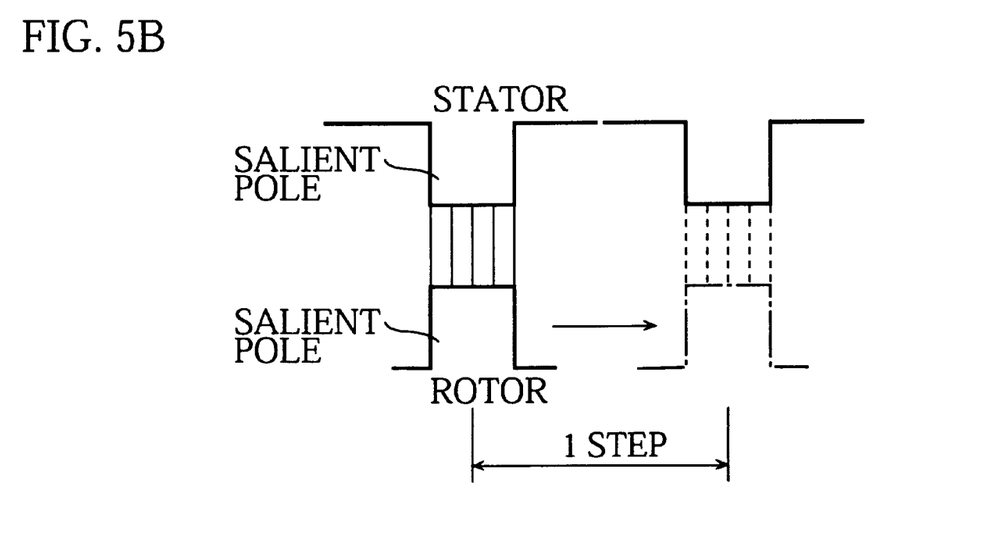
FIG. 5B shows a rotational state of a rotor in a full-step drive.

Moreover, in the five-phase-on drive, the rotor is rotated with salient poles respectively facing excited salient poles of the stator for each step, as shown in FIG. 5B. The state where the salient poles of the rotor face the excited salient poles of the stator means that the rotor is in a stable position.

Meanwhile, when the four-and-five-phase-on drive is operational, the rotor is alternately rotated with salient poles respectively facing excited salient poles of the stator and with salient poles respectively being located between two salient poles of the stator as shown in FIG. 5A (this position of the salient poles of the rotor is simply referred to as the "middle position" hereinafter). As known in general, the rotor is rotated more smoothly in the four-and-five-phase-on drive than in the five-phase-on drive, and rotational nonuniformity is reduced.

The ROM 59 stores the number of steps to provide the timing of starting the exposure on the photosensitive drum 31 after the resist sensor 32 detects the leading edge of the recording sheet S transported on the transport belt 14 (shown in FIG. 1).

Figure 6:
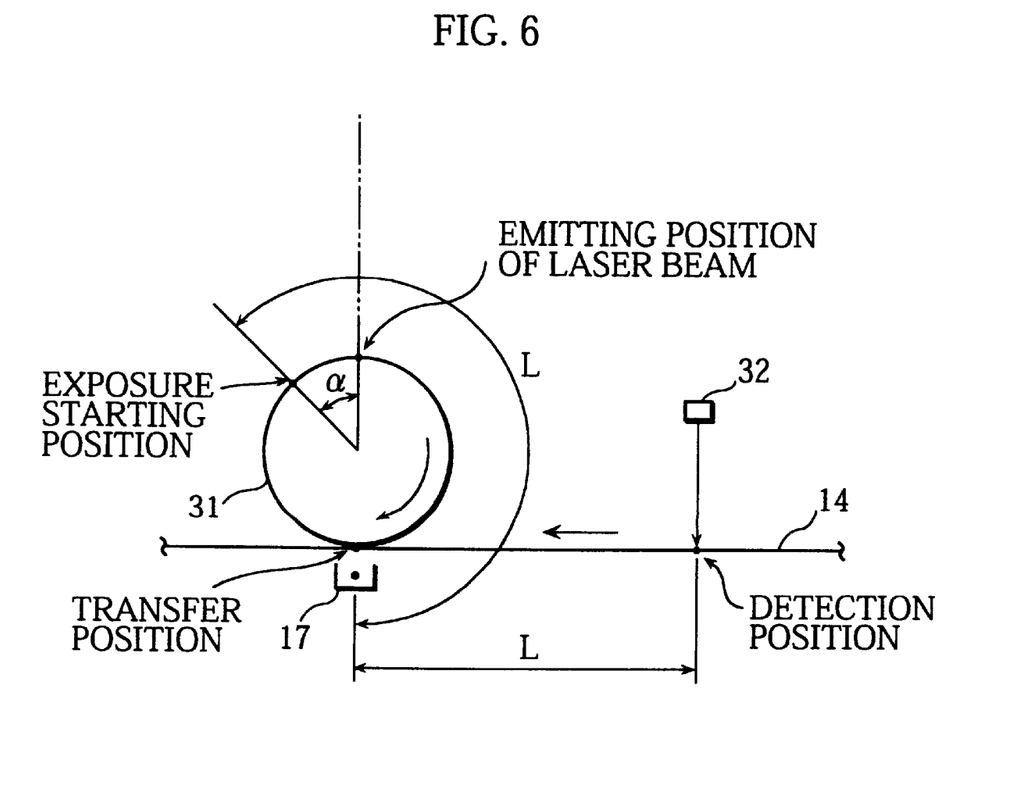
FIG. 6 is a drawing to help explain a start timing of exposure on the photosensitive drum.

As shown in FIG. 6, the distance between the detection position of the resist sensor 32 and the transfer position is referred to as "L". The moving speed of the transport belt 14 and the circumferential speed of the photosensitive drum 31 are set equal, as described above. Thus, on detection of the leading edge of the recording sheet S by the resist sensor 32, the exposure needs to be started from the position measured the distance "L" from the transfer position in the opposite direction of rotation of the photosensitive drum 31. More specifically, the exposure needs to be started after the photosensitive drum 31 is rotated the angle a from the detection of the leading edge of the recording sheet S. The number of steps "N" is obtained by dividing the angle a by the standard step angle (i.e., the step angle in the full-step drive) of the stepping motor 33, and is stored in the ROM 59. Diameters of the photosensitive drums 31C to 31K are the same and the respective distances between the transfer positions and the corresponding detection positions of the resist sensors 32C to 32K are set equal, so that the number of steps "N" stored in the ROM 59 is used in common.

The CPU 51 first has the stepping motor 33 rotate by the full-step in the five-phase-on drive. When the resist sensor 32 detects the leading edge of the recording sheet S in this state, the CPU 51 switches the drive mode from the full-step drive to the half-step drive (i.e., the four-and-five-phase-on drive). On switching the drive mode, the CPU 51 starts counting the number of pulses of the drive pulse train. When the count value reaches 2N, the CPU 51 instructs to start the exposure.

Figure 7:
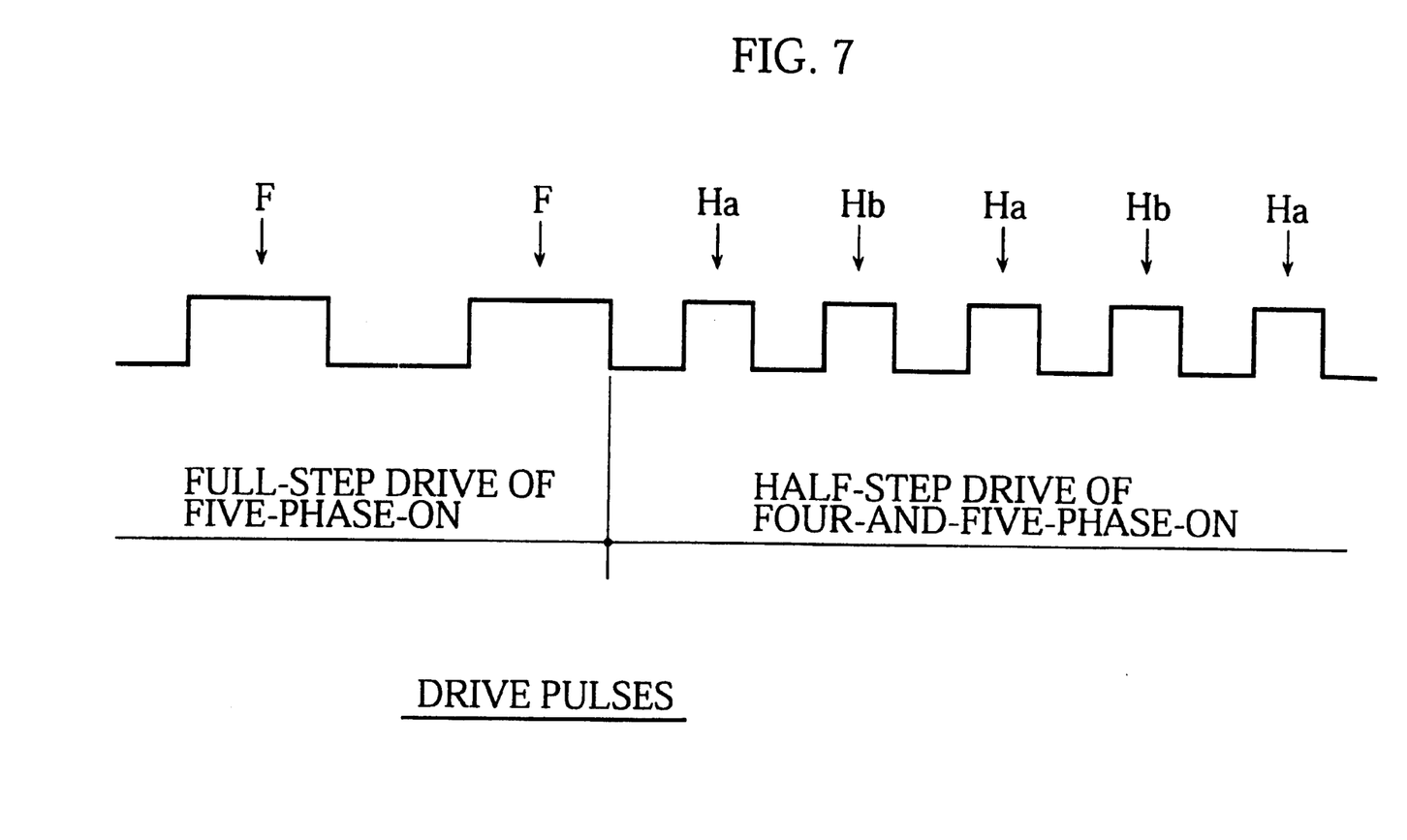
FIG. 7 shows drive pulses generated before and after the switching of the drive mode from the full-step drive to the half-step drive.

When the photosensitive drum 31 is exposed, the stepping motor 33 is made to rotate by the half-step angle to have the photosensitive drum 31 rotate as smoothly as possible. In this case, however, the rotor is rotated with the salient poles being alternately located in the stable position and the middle position. The CPU 51 cannot realize from a drive pulse when the rotor is in the stable position. To address this problem, in the present embodiment, the CPU 51 first has the stepping motor 33 rotate by the full-step angle in the five-phase-on drive so that the rotor is in the stable position for each pulse as indicated by the arrows F in FIG. 7, and switches from the full-step drive to the half-step drive before the exposure is started. After the switching, the rotor is in the stable position for each even-numbered pulse as indicated by the arrows Hb in FIG. 7. The CPU 51 instructs to start the exposure on an even-numbered pulse. This enables a higher precision in determination of the exposure starting position on the photosensitive drum 31.

Figure 8:
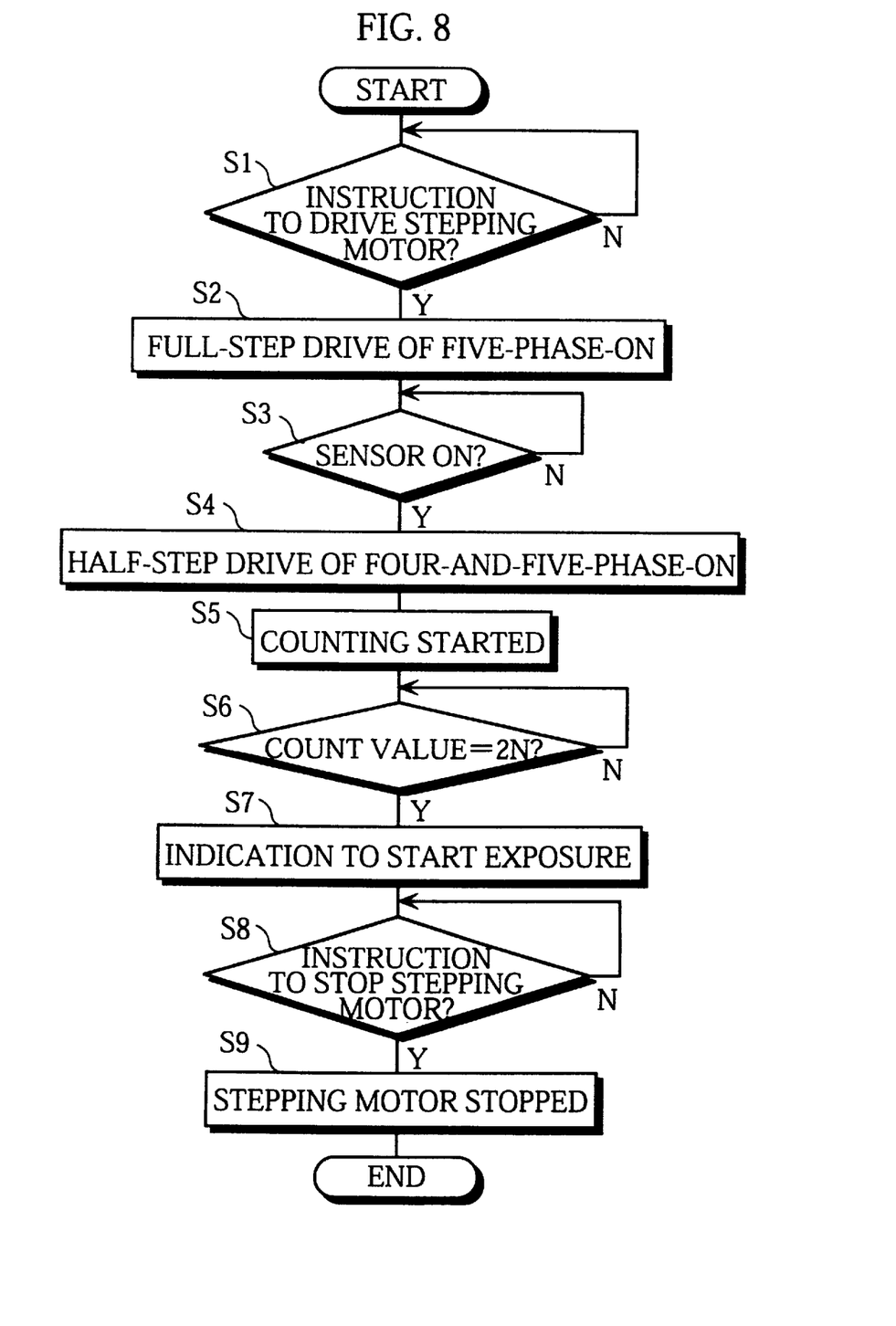
FIG. 8 is a flowchart showing the control of a driver unit mainly performed by a CPU of the drive controlling unit.

FIG. 8 is a flowchart showing the control of the driver unit 53 performed by the CPU 51. Note that the controls of the driver units 53C to 53K are the same, and therefore, the explanation is given only for the driver unit 53C as one example.

On receiving an instruction from the main controlling unit 61 to drive the stepping motor 33C ("Yes" in step S1), the CPU 51 has the stepping motor 33C rotate by the full-step in the five-phase-on drive (step S2). More specifically, the CPU 51 instructs the pulse generating unit 52 to generate the clock pulse train of a certain frequency, as well as outputting a drive signal for driving the stepping motor 33C and an exciting mode switching signal of High to the exciting phase controlling unit 54C of the driver unit 53C.

When the resist sensor 32C detects the leading edge of the recording sheet S transported on the transport belt 14 ("Yes" in step S3), the CPU 51 switches the exciting mode switching signal from High to Low and so has the half-step drive operational (step S4). Simultaneously, the CPU 51 starts counting the number of pulses of the drive pulse train using an internal counter (step S5).

When the count value of the internal counter reaches 2N ("Yes" in step S6), the CPU 51 outputs a signal indicating to start the exposure on the photosensitive drum 31C to the main controlling unit 61 (step S7). Receiving the signal, the main controlling unit 61 controls the exposure controlling unit 400 to start the exposure on the photosensitive drum 31C.

Then, the CPU 51 waits for an instruction from the main controlling unit 61 to stop the stepping motor 33C (step S8). When receiving the instruction ("Yes" in step S8), the CPU 51 has the pulse generating unit 52 stop the generation of the clock pulse train, and outputs a stop signal to the exciting phase controlling unit 54C to have the stepping motor 33C stopped (step S9).

In the present embodiment, the drive mode is switched from the full-step drive to the half-step drive and the exposure is started on the even-numbered pulse after the switching. However, other methods can be used. For example, a so-called "brake excitation" may be performed before the stepping motor is driven. By means of the brake excitation, the rotor is stopped with the salient poles facing the excited salient poles of the stator. With this state, the stepping motor may be rotated in the half-step drive, and the exposure may be started on the even-numbered pulse after the rotation of the stepping motor is started in the half-step drive.

In the present embodiment, when the photosensitive drum is scanned, the half-step drive is activated, with the step angle being half of the standard step angle. However, the present invention can be used in the case of a so-called "micro-step drive" where the standard step angle is further divided. More specifically, when the photosensitive drum is scanned, the micro-step drive may be activated, with the step angle being a quarter of the standard angle, for example. In this case, after the switching of the drive mode from the full-step drive to the micro-step drive, the rotor is in the stable position on pulses with multiple numbers of four. As is the case with the stated embodiment, the exposure may be started in synchronization with the timing at which the rotor is in the stable position. This is to say, when the standard angle is divided by m and the count value reaches the multiple number of m in step S6 of the flowchart shown in FIG. 8, the CPU 51 may output a signal indicating to start the exposure on the photosensitive drum in step S7.

A copier is described as the present invention in the stated embodiment. However, the present invention can be used for an image forming apparatus, such as a laser printer and a facsimile, which has a photosensitive drum.

Although the present invention has been fully described by way of examples with reference to the accompanying drawings, it is to be noted that various changes and modifications will be apparent to those skilled in the art.

Therefore, unless such changes and modifications depart from the scope of the present invention, they should be constructed as being included therein.

What is claimed is:

1. An image forming apparatus comprising:

a photosensitive drum;

a stepping motor which is made to rotate by a small step angle smaller than a standard step angle and rotationally drives the photosensitive drum;

an optical unit for scanning the photosensitive drum, which is rotationally driven by the stepping motor, one scanning line at a time using an optical beam to form a latent image on the photosensitive drum; and a controller for having the optical unit start a scanning on the photosensitive drum in synchronization with a timing at which one of excited salient poles of a stator faces one of salient poles of a rotor, the stator and the rotor being included in the stepping motor.

2. The image forming apparatus of claim 1 further comprising a pulse generating unit for generating a pulse train to rotate the rotor of the stepping motor by one step angle for each pulse, the step angle being one of a standard step angle during standard step angle drive and a small step angle during small step angle drive, wherein the small step angle is 1/m of the standard step angle, with m being an integer which is greater than one, wherein the stepping motor is made to rotate by one of the standard step angle and the small step angle, and wherein the controller executes processes including:

having the pulse generating unit generate a pulse train corresponding to the standard step angle drive;

having the pulse generating unit switch to generating a pulse train corresponding to the small step angle drive;

counting a number of pulses of the pulse train generated after a switching; and having the optical unit start the scanning on the photosensitive drum in synchronization with a timing at which the counted number of pulses reaches a multiple of m.

3. The image forming apparatus of claim 2, wherein m is two.

4. The image forming apparatus of claim 1, wherein the stepping motor directly drives the photosensitive drum.

5. The image forming apparatus of claim 1 further comprising at least one set, each set including the photosensitive drum, the stepping motor, and the optical unit, wherein a color image is formed by superimposing images formed in different colors by each set.

6. A method for controlling a scanning start timing of an image forming apparatus, the image forming apparatus comprising:

a photosensitive drum;

a stepping motor which is made to rotate by a standard step angle and a small step angle that is 1/m of the standard step angle, m being an integer which is greater than one, to rotate the photosensitive drum;

an optical unit for scanning the photosensitive drum, which is rotationally driven by the stepping motor, one scanning line at a time using an optical beam to form a latent image on the photosensitive drum; and a pulse generating unit for generating a pulse train to rotate the rotor of the stepping motor by one step angle for each pulse, the step angle being one of a standard step angle during standard step angle drive and a small step angle during small step angle drive, and the method including;

a first step for having the pulse generating unit generate a pulse train corresponding to the standard step angle drive;

a second step for having the pulse generating unit switch to generating a pulse train corresponding to the small step angle drive;

a third step for counting a number of pulses of the pulse train generated after a switching; and a fourth step for having the optical unit start the scanning on the photosensitive drum in synchronization with a timing at which the counted number of pulses reaches a multiple of m.

7. The method of claim 6, wherein the stepping motor directly drives the photosensitive drum.

8. The method of claim 6, wherein m is two.

9. The method of claim 6, wherein the image forming apparatus comprises a plurality of sets, each set including the photosensitive drum, the stepping motor, and the optical unit, and forms a color image by superimposing images formed in different colors by each set.

10. An image forming apparatus comprising:

a photosensitive member;

a stepping motor which is made to rotate by a small step angle smaller than a standard step angle and rotationally drives the photosensitive member;

an optical unit for exposing the photosensitive member, which is rotationally driven by the stepping motor, with light to form a latent image on the photosensitive member; and a controller for having the optical unit start an exposure of the photosensitive member in synchronization with a timing at which one of excited salient poles of a stator faces one of salient poles of a rotor, the stator and the rotor being included in the stepping motor.

11. the image forming apparatus of claim 10 further comprising:

a pulse generating unit for generating a pulse train to rotate the rotor of the stepping motor by one step angle for each pulse, the step angle being one of a standard step angle during standard step angle drive and a small step angle during small step angle drive, wherein the small step angle is $1/m$ of the standard step angle, with m being an integer which is greater than one, wherein the stepping motor is made to rotate by one of the standard step angle and the small step angle, and wherein the controller executes processes including:

having the pulse generating unit generate a pulse train corresponding to the standard step angle drive;

having the pulse generating unit switch to generating a pulse train corresponding to the small step angle drive;

counting a number of pulses of the pulse train generated after a switching; and having the optical unit start the exposure of the photosensitive member in synchronization with a timing at which the counted number of the pulses reaches a multiple of m.

12. The image forming apparatus of claim 10, wherein the stepping motor directly drives the photosensitive member.

13. The image forming apparatus of claim 11, wherein m is two.

14. The image forming apparatus of claim further comprising at least one set, each set including the photosensitive member, the stepping motor, and the optical unit, wherein a color image is formed by superimposing images formed in different colors by each set.

15. A method for controlling an exposure start timing of an image forming apparatus, the image forming apparatus comprising:

a photosensitive member;

a stepping motor which is made to rotate by a standard step angle and a small step angle that is $1/m$ of the standard step angle, m being an integer which is greater than one, to rotate the photosensitive member;

an optical unit for exposing the photosensitive member, which is rationally driven by the stepping motor, with light to form a latent image on the photosensitive member; and a pulse generating unit for generating a pulse train to rotate the rotor of the stepping motor by one step angle for each pulse, the step angle being one of a standard step angle during standard step angle drive and a small step angle during small step angle drive, and the method including:

a first step for having the pulse-generating unit generate a pulse train corresponding to the standard step angle drive;

a second step for having the pulse generating unit switch to generating a pulse train corresponding to the small step angle drive;

a third step for counting a number of pulses of the pulse train generated after a switching; and a fourth step for having the optical unit start an exposure of the photosensitive member in synchronization with a timing at which the counted number of pulses reaches a multiple of m.

16. The method of claim 15, wherein the stepping motor directly drives the photosensitive member.

17. The method of claim 15, wherein m is two.

18. The method of claim 15, wherein the image forming apparatus comprises a plurality of sets, each set including the photosensitive member, the stepping motor, and the optical unit, and forms a color image by superimposing images formed in different colors by each set.

19. An image forming apparatus comprising:

an image bearing member;

a stepping motor which is made to rotate by a small step angle smaller that a standard step angle and rotationally drives the image bearing member;

an image writer for writing an image on the image bearing member; and a controller for having the image writer start an image writing to the image bearing member in synchronization with a timing at which one of excited salient poles of a stator faces one of salient poles of a rotor, the stator and the rotor being included in the stepping motor.

* * * * *